US011343133B2

(12) United States Patent
Deshmukh

(10) Patent No.: US 11,343,133 B2
(45) Date of Patent: May 24, 2022

(54) VIRTUAL SNMP TRAP RECEIVER

(71) Applicant: T-Mobile USA, Inc., Bellevue, WA (US)

(72) Inventor: Amit Shantanu Deshmukh, Sammamish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 335 days.

(21) Appl. No.: 16/151,976

(22) Filed: Oct. 4, 2018

(65) Prior Publication Data

US 2020/0112473 A1 Apr. 9, 2020

(51) Int. Cl.
| | | |
|---|---|---|
| *H04L 41/04* | (2022.01) | |
| *G06F 9/455* | (2018.01) | |
| *H04L 41/0213* | (2022.01) | |
| *G06F 16/23* | (2019.01) | |
| *G06F 16/951* | (2019.01) | |
| *G06F 9/50* | (2006.01) | |

(52) U.S. Cl.
CPC .......... *H04L 41/04* (2013.01); *G06F 9/45533* (2013.01); *G06F 9/5077* (2013.01); *G06F 16/2379* (2019.01); *G06F 16/951* (2019.01); *H04L 41/0213* (2013.01)

(58) Field of Classification Search
CPC ... H04L 41/04; H04L 41/0213; G06F 16/951; G06F 16/2379; G06F 9/45533; G06F 9/5077
See application file for complete search history.

(56) References Cited

U.S. PATENT DOCUMENTS

| | | | | |
|---|---|---|---|---|
| 7,028,228 | B1 * | 4/2006 | Lovy | G06F 11/3495 |
| | | | | 714/47.2 |
| 9,461,943 | B2 * | 10/2016 | Narasimhan | H04L 41/0813 |
| 9,465,641 | B2 * | 10/2016 | Ryu | G06F 9/45558 |
| 9,571,332 | B2 * | 2/2017 | Subramaniam | G06F 9/45558 |
| 9,973,375 | B2 * | 5/2018 | Shatzkamer | H04L 41/04 |
| 2003/0101236 | A1 * | 5/2003 | Ohara | H04L 69/329 |
| | | | | 707/E17.108 |
| 2004/0122972 | A1 * | 6/2004 | Gibson | H04L 41/00 |
| | | | | 709/236 |
| 2005/0010757 | A1 * | 1/2005 | Bosler | H04L 9/3297 |
| | | | | 713/156 |

(Continued)

OTHER PUBLICATIONS

PRTG Receives And Analyzes Your SNMP Traps!. Paessler AG, 2018 [online], [retrieved on Oct. 12, 2018]. Retrieved from the Internet <https://www.paessler.com/snmp_trap_receiver>.

(Continued)

*Primary Examiner* — Wei Y Zhen
*Assistant Examiner* — Brahim Bourzik
(74) *Attorney, Agent, or Firm* — Han Santos, PLLC

(57) ABSTRACT

A virtualized trap receiver that virtualizes Simple Network Management Protocol (SNMP) agents and trap receivers over a set of virtual machines is provided. The virtualized trap receiver receives trap messages regarding a particular application running on one or more application servers. The virtualized trap receiver processes the received trap messages at one or more virtual machines. The virtualized trap receiver responds to a query by a network manager regarding an operation of the particular application on the application servers based on the processed trap messages.

15 Claims, 6 Drawing Sheets

(56) References Cited

U.S. PATENT DOCUMENTS

| | | | |
|---|---|---|---|
| 2005/0216421 A1* | 9/2005 | Barry | H04M 15/8044 |
| | | | 705/64 |
| 2008/0098103 A1* | 4/2008 | Packiam | H04L 12/66 |
| | | | 709/223 |
| 2013/0275582 A1* | 10/2013 | Gedam | H04L 41/0213 |
| | | | 709/224 |
| 2013/0305245 A1* | 11/2013 | Doddavula | G06F 9/5083 |
| | | | 718/1 |
| 2013/0339503 A1* | 12/2013 | Annamalaisami | H04L 41/042 |
| | | | 709/223 |
| 2016/0170793 A1* | 6/2016 | Decusatis | H04L 43/0817 |
| | | | 718/1 |
| 2017/0170971 A1* | 6/2017 | Buendgen | H04L 63/0823 |

OTHER PUBLICATIONS

SNMP Trap Receiver Monitoring with Network Performance Monitor. SolarWinds Worldwide, 2018 [online], [retrieved on Oct. 12, 2018]. Retrieved from the Internet <https://www.solarwinds.com/topics/snmp-trap-receiver>.

Trap Receiver. Unleash Networks, 2011-2014 [online], [retrieved on Oct. 12, 2018]. Retrieved from the Internet <https://www.unleashnetworks.com/products/unbrowse-snmp/snmp-traps.html>.

European Patent Application No. 19198162.0, European Search Report dated Jan. 31, 2020, 7 pages.

* cited by examiner

```xml
<?xml version="1.0" encoding="UTF-8"?>
<trapDestCfg xmlns:xsi="http://www.w3.org/2001/XMLSchema-instance" xmlns="http://www.ericsson.com/esa" xsi:schemalocation="http://www.ericsson.com/esa trapDestCfg.xsd">
    <managerDefinition snmpVersion="v2c" active="yes">
        <ip>10.253.190.73</ip>
        <port>162</port>
        <securityName>v1v2ReadWriteSecName</securityName>
        <securityLevel>noAuthNoPriv</securityLevel>
    </managerDefinition>
    <managerDefinition snmpVersion="v3" active="no">
        <ip>127.0.0.1</ip>
        <port>162</port>
        <securityName>v3AuthSHAPrivDESSecName</securityName>
        <securityLevel>authPriv</securityLevel>
    </managerDefinition>
</trapDestCfg>
```

FIG. 4

VIRTUAL SNMP TRAP RECEIVER

BACKGROUND

Simple Network Management Protocol (SNMP) is a popular protocol for network management. It is used for collecting information from network devices and configuring network devices such as servers, printers, hubs, switches, and routers on an Internet Protocol (IP) network.

A SNMP agent is a program that is packaged within a network device. The SNMP agent collects local information from the network device and makes the collected information available as a management information database for query by a SNMP manager. A SNMP manager or management system is an entity that communicates with SNMP agents that are implemented on network devices. The SNMP manager's functions include querying SNMP agents and getting responses from the SNMP agents.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicate similar or identical items.

FIG. 4 illustrates an example trap destination configuration file.

DETAILED DESCRIPTION

The integration of Simple Network Management Protocol (SNMP) agents with their corresponding SNMP managers involves installing an SNMP agent for each instance of a managed application. A corresponding manager then grants a client certificate for every instance of the managed application. These procedures may result in a very expensive and time-consuming process if the number of application servers deployed to implement the instances of the managed application grows large.

This disclosure is directed to a virtualized trap receiver system that virtualizes SNMP agents and trap receivers over a set of virtual machines. The virtualized trap receiver communicates with one or more application servers for a particular managed application. The virtualized trap receiver receives trap messages from one or more application servers. A trap message from an application server reports status or management data local to the application server. The virtual machines of the virtualized trap receiver process the received trap messages. When queried by a network manager regarding the particular application running in the application servers, the virtualized trap receiver responds based on the processed trap messages. The virtualized trap receiver may determine whether to add a virtual machine or remove a virtual machine by examining workload information such as processor usage, memory usage, or query latencies.

In some embodiments, the virtualized trap receiver is already certified by the network manager (as a certified agent of the network manager) so that the application servers need not be certified by the network manager. This simplifies configuration, minimizes the number of client certificates, and reduces operating expenses. This also makes the expansion of capacity (e.g., new deployment of application servers) more reliable and scalable.

Figure 1:
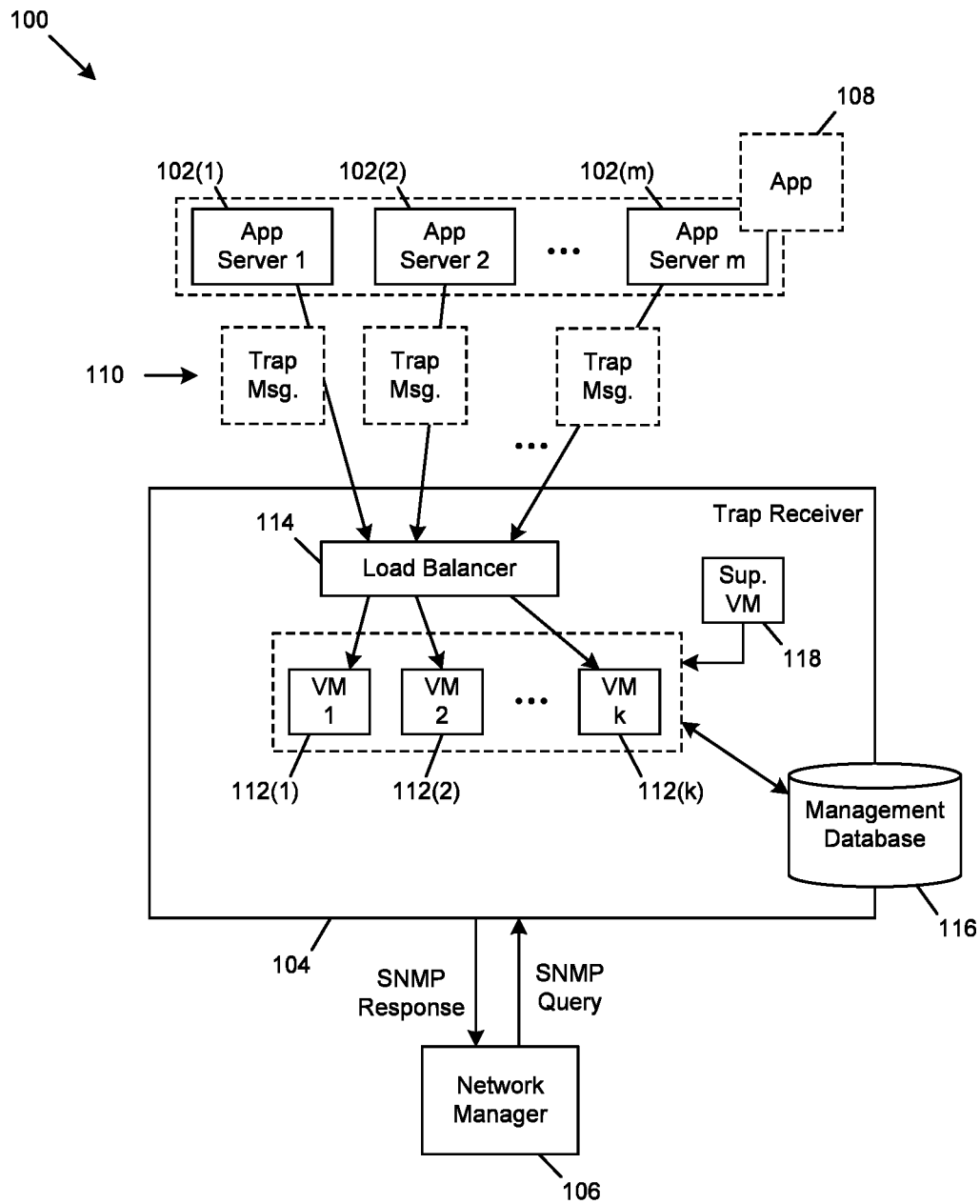
FIG. 1 conceptually illustrates a network management system with virtualized SNMP agents and trap receivers.

FIG. 1 conceptually illustrates a network management system 100 with virtualized SNMP agents and trap receivers. The network management system 100 includes application servers 102(1)-102(m), a trap receiver 104, and a network manager 106.

The application servers 102(1)-102(m) are servers of a particular application 108 and may generate events, errors, and/or status related to the execution of the particular application 108. The trap receiver 104 receives trap messages 110 from the application servers 102(1)-102(m). Based on the received trap messages, the trap receiver 104 responds to network management queries regarding the application servers 102(1)-102(m) by the network manager 106. A trap message generated by one of the application servers 102(1)-102(m), say the application server 102(m), may include status, error, event, or other types of local information of the application server.

The trap receiver 104 is a virtualized SNMP trap receiver. As illustrated, the trap receiver 104 is a system that operates several virtual machines (VMs) 112(1)-112(k). The trap receiver 104 operates a load balancer 114 that distributes the workload of processing the incoming trap messages 110 among the several virtual machines 112(1)-112(k). The load balancer 114 may select a virtual machine to process each received trap message by round-robin, random, or any other load balancing algorithms. In some embodiments, the number of virtual machines 112(1)-112(k) may not correspond with the number of application servers 102(1)-102(m). In other words, the number of virtual machines is not necessarily the same as the number of application servers.

A virtual machine selected to process a trap message reformats the events, error, or other types of status carried by the trap message into SNMP format, e.g., by processing the trap messages 110 into a management information database 116 for SNMP queries. The virtual machines 112(1)-112(k) are therefore virtualized SNMP agents. However, unlike the conventional SNMP agents that are implemented at the application servers, the virtual machines 112(1)-112(k) are virtualized SNMP agents implemented at the trap receiver 104. Furthermore, the virtualized trap receiver 104 is pre-certified to work with the network manager 106, so the application servers 102(1)-102(m) are not individually certified with client certificates.

The virtualized trap receiver is scalable with regard to workload by adding or reducing the number of virtual machines assigned to process the received trap messages. In some embodiments, the task of determining the number of virtual machines assigned to process the received trap messages is performed by a supervising virtual machine 118. The supervising virtual machine 118 may allocate additional virtual machines to process the incoming trap messages if the supervising virtual machine 118 determines that more virtual machines are to be allocated to handle the workload. The supervising virtual machine 118 may also de-allocate virtual machines from processing incoming trap messages if the supervising virtual machine 118 determines that fewer virtual machines are sufficient to handle the workload.

In some embodiments, the supervising virtual machine 118 determines the number of virtual machines allocated to processing the trap messages 110 by examining workload parameters of the virtual machines allocated to processing trap messages, parameters such as processor usage, memory usage, or query latencies (e.g., the delays between the application servers and the network manager).

The network manager 106 monitors the functioning of the particular application 108 executing on the several application servers 102(1)-102(m). The network manager 106 uses SNMP protocol to query the status, events, and other management information regarding the functionalities of the particular application 108 at the application servers. Instead of directly querying SNMP agents operating at those application servers, the network manager 106 queries the trap receiver 104, which operates the virtual machines 112(1)-112(k) that serve as virtual SNMP agents for the application servers. Specifically, the network manager uses the SNMP protocol to query the trap receiver 104 and to obtain responses based on information stored in the management information database 116, whose content is generated by the virtual machines 112(1)-112(k) based on the trap messages 110. The network manager 106 may in turn present various metrics and status regarding the operation of the particular application 108 to the user based on the responses to the SNMP queries.

Figure 2:
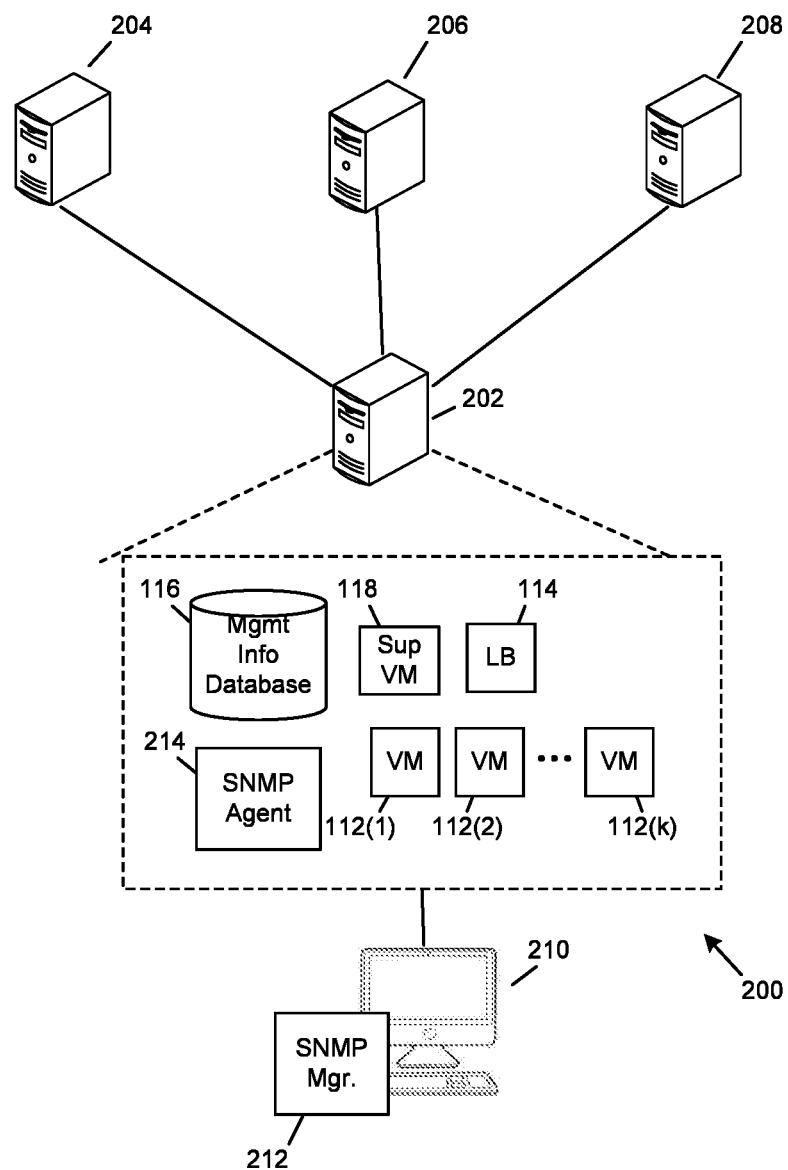
FIG. 2 conceptually illustrates the network management system as implemented over a network.

FIG. 2 conceptually illustrates the network management system 100 implemented over a network 200. The network 200 interconnects various computing devices, including computing devices 202, 204, 206, 208 and 210. The computing devices 202-210 may be computing devices located at one or more data centers. The computing devices 202-210 may belong to different clusters or different physical sites.

In this example, the computing device 202 implements the trap receiver 104, and the computing devices 204, 206, and 208 implement at least some of the application servers 102(1)-102(m). The computing device 210 implements the network manager 106. The computing device 202 is a system of one or more physical devices that virtualizes the trap receiver 104 on one or more of the virtual machines 112(1)-112(k). The computing device 202 also implements the supervising virtual machine 118 and the load balancer 114. The trap receiver computing device 202 receives trap messages from the computing devices 204, 206, and 208 over the network 200. The network manager computing device 210 operates an SNMP manager program 212 (e.g., OpenView™ or OVO™) and the trap receiver computing device 202 operates an SNMP agent program 214 that is certified by the SNMP manager. The respective SNMP manager program 212 and agent program 214 allow the computing device 210 that implements the network manager 106 to query the management information database 116 stored at the trap receiver computing device 202 over the network 200.

Figure 3:
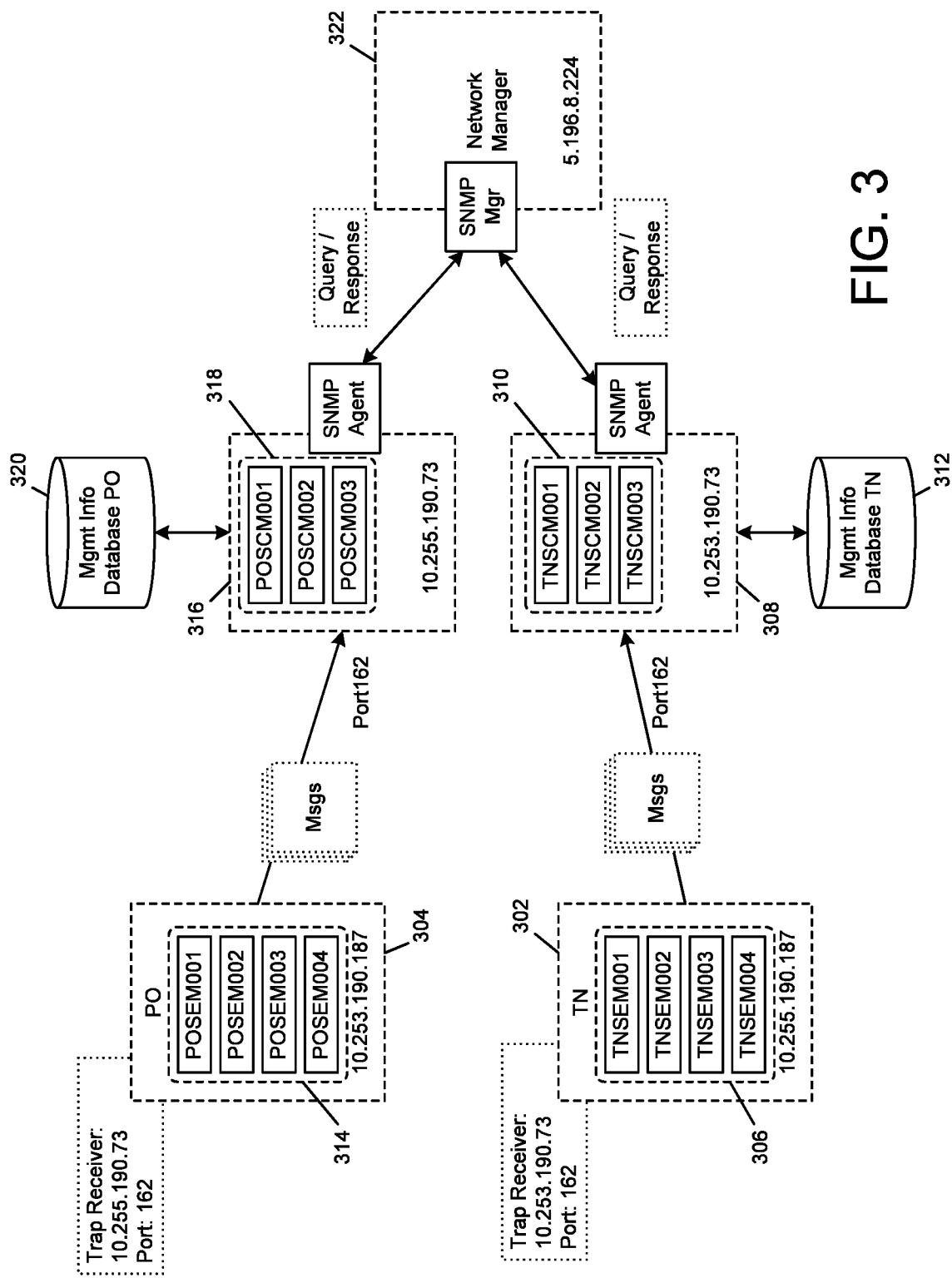
FIG. 3 illustrates a network management system that monitors two different clusters of application servers running two different applications.

In some embodiments, a network manager, such as the network manager 106, may monitor multiple applications operating in multiple groups or clusters of application servers through multiple trap receivers. FIG. 3 illustrates a network management system 300 that monitors two different clusters of application servers running two different applications. Each application has its own corresponding trap receiver that acts as virtualized SNMP agents for application servers.

As illustrated, the network management system 300 is managing two applications 302 ("TN") and 304 ("PO"). The first application 302 is operating in application servers 306 (illustrated as application servers TNSEM001-TNSEM004). The application servers 306 are configured to send their trap messages to a trap receiver 308 at IP address 10.253.190.73 using port 162. The trap receiver 308 operates several virtual machines 310 (illustrated as TNSCM001-TNSCM003) for processing the trap messages from the application servers 306 into a management information database 312 for the application 302 (management information database TN 312).

The second application 304 is operating in application servers 314 (illustrated as application servers POSEM001-POSEM004). The application servers 314 are configured to send their trap messages to a trap receiver 316 at IP address 10.255.190.73 using port 162. The trap receiver 316 operates several virtual machines 318 (illustrated as POSCM001-POSCM003) for processing the trap messages from the application servers 314 into a management information database 320 for the application 304 (management information database PO 320).

A network manager 322 monitors the application 302 by querying the management information database 312 and the application 304 by querying the management information database 320. The network manager 322 operates an SNMP manager program which allows the network manager 322 to communicate with the SNMP agents operating in the trap receivers 308 and 316, which hosts the management information databases 312 and 320, respectively.

The application servers of the network management systems 100 and 300 do not operate SNMP agents. Rather, the application servers are configured to send trap messages directly to the trap receiver without using an SNMP agent program. An application server can be configured to send trap messages to a trap receiver by modifying its configuration files to add the IP address of the trap receiver, files such as /etc/hosts, and trap destination configuration file /usr/local/esa/conf/trapDestCfg.xml. In some embodiments, the application servers belonging to the same cluster can be updated by editing a master configuration file such as that of a service enrollment manager (SEM) /etc/puppet/modules/hostsfile/templates/hosts.erb.

In the example of FIG. 3, the /etc/hosts file and the trap destination configuration file of the application servers 306 can be edited to add the IP address 10.253.190.73 of the trap receiver 308. FIG. 4 illustrates an example trap destination configuration file 400. As illustrated, the trap destination configuration file 400 trapDestCfg.xml is edited to specify an IP address 10.253.190.73 and port 162. An application server (such as the application server "TNSEM001") executing the trap destination configuration 400 is configured to send trap messages generated at the application server to the IP address 10.253.190.73 at port 162, which is the address of the trap receiver 308. The edited trap destination configuration 400 allows the trap messages to be sent to the trap receiver 308 rather than the network manager 322 such that the application server can send trap messages without being certified by the SNMP manager running on the network manager 322.

Figure 5:
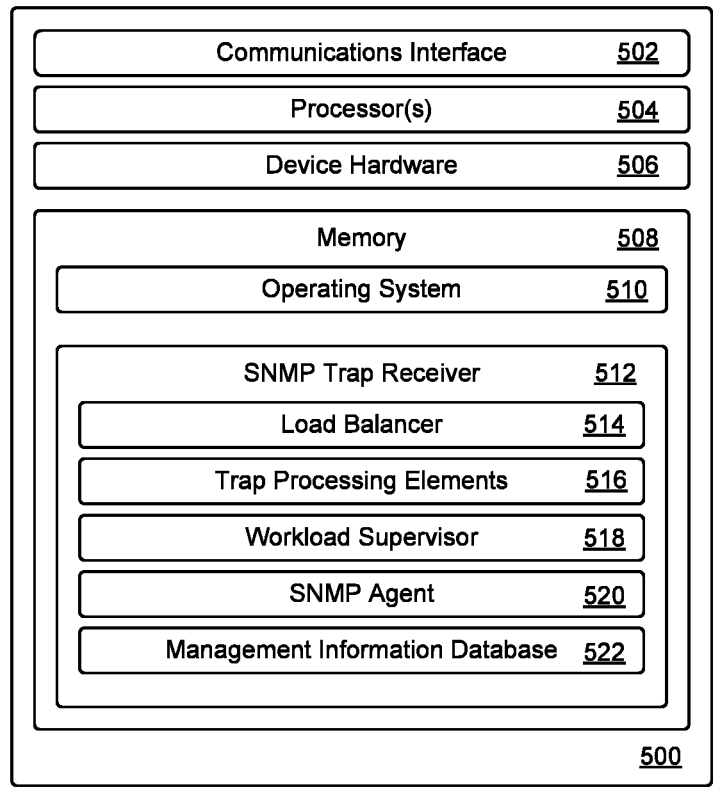
FIG. 5 is a block diagram showing various components of an example trap receiver, consistent with an embodiment of the disclosure.

FIG. 5 is a block diagram showing various components of an example trap receiver, consistent with an embodiment of the disclosure. The trap receiver receives trap messages from application servers and processes the received trap messages into a management information database for query by a network manager. The trap receiver operates multiple virtual machines to process the received trap messages, and the number of virtual machines may be increased or reduced based on workload.

The figure illustrates a computing device 500 implementing a trap receiver such as the computing device 202. The trap receiver computing device 500 may be a general-purpose computer, such as a desktop computer, tablet computer, laptop computer, server, or an electronic device that is capable of receiving inputs, processing the inputs, and generating output data. The computing device 500 may also be a virtual computing device such as a virtual machine or a software container that is hosted in a cloud.

The computing device 500 may be equipped with one or more of the following: a communications interface 502, one or more processors 504, device hardware 506, and memory 508. The communications interface 502 may include wireless and/or wired communication components that enable the computing devices to transmit data to and receive data from other devices. The data may be relayed through a dedicated wired connection or via a communications network. The device hardware 506 may include additional hardware that performs user interface, data display, data communication, data storage, and/or other server functions.

The memory 508 may be implemented using computer-readable medium, such as computer storage medium. Computer-readable medium includes, at least, two types of computer-readable media, namely computer storage media and communications media. Computer storage media may include volatile and non-volatile, removable and non-removable media implemented in any method or technology for storage of information such as computer-readable instructions, data structures, program modules, or other data. Computer storage media may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store information for access by a computing device. In contrast, communication media may embody computer-readable instructions, data structures, program modules, or other data in a modulated data signal, such as a carrier wave, or other transmission mechanisms.

The processors 504 and the memory 508 of the computing device 500 may implement an operating system 510 and an SNMP trap receiver 512. The SNMP trap receiver 512 includes a load balancer 514, trap processing elements 516, a workload supervisor 518, an SNMP agent 520, and a management information database 522.

The operating system 510 may include components that enable the computing devices 500 to receive and transmit data via various interfaces (e.g., user controls, communications interface, and/or memory input/output devices), as well as process data using the processors 504 to generate output. The operating system 510 may include a presentation component that presents the output (e.g., display the data on an electronic display, store the data in memory, transmit the data to another electronic device, etc.). The operating system 510 may include a hypervisor that allows the computing device to operate one or more virtual machines and/or virtual network components. Additionally, the operating system 510 may include other components that perform various additional functions generally associated with an operating system.

The SNMP trap receiver 512 is a program that enables the computing device 500 to receive trap messages from the application servers and to respond to query by a network manager. The load balancer 514 is a software component that distributes trap messages among the trap processing elements, by round-robin or another type of workload distribution algorithm. In some embodiments, a load balancer is implemented as a virtual machine. The trap processing elements 516 are software components that process the incoming trap messages into content of the management information database 522. In some embodiments, the trap processing elements are implemented as virtual machines (e.g., virtual machines 112(1)-112(k)), and the number of virtual machines implementing the trap processing elements may be dynamically increased or decreased.

The workload supervisor 518 is a software component that controls the number of virtual machines that are used as trap processing elements. The workload supervisor 518 makes this determination by examining processor usage, memory usage, or a latency between an application server and the network manager. In some embodiments, the workload supervisor 518 is implemented as a virtual machine (e.g., the supervising virtual machine 118).

The SNMP agent 520 is a program responsible for responding to queries by an SNMP network manager. In some embodiments, the SNMP agent 520 is certified by a client certificate from the SNMP network manager, which allows the trap receiver computing device 500 to communicate with an SNMP manager through SNMP protocol.

The management information database 522 stores information that is of interest to the network manager. The content of the database is generated by the trap processing elements 516. The SNMP trap receiver 512 responds to queries for management information from the network manager by retrieving data from the management information database 522.

Figure 6:
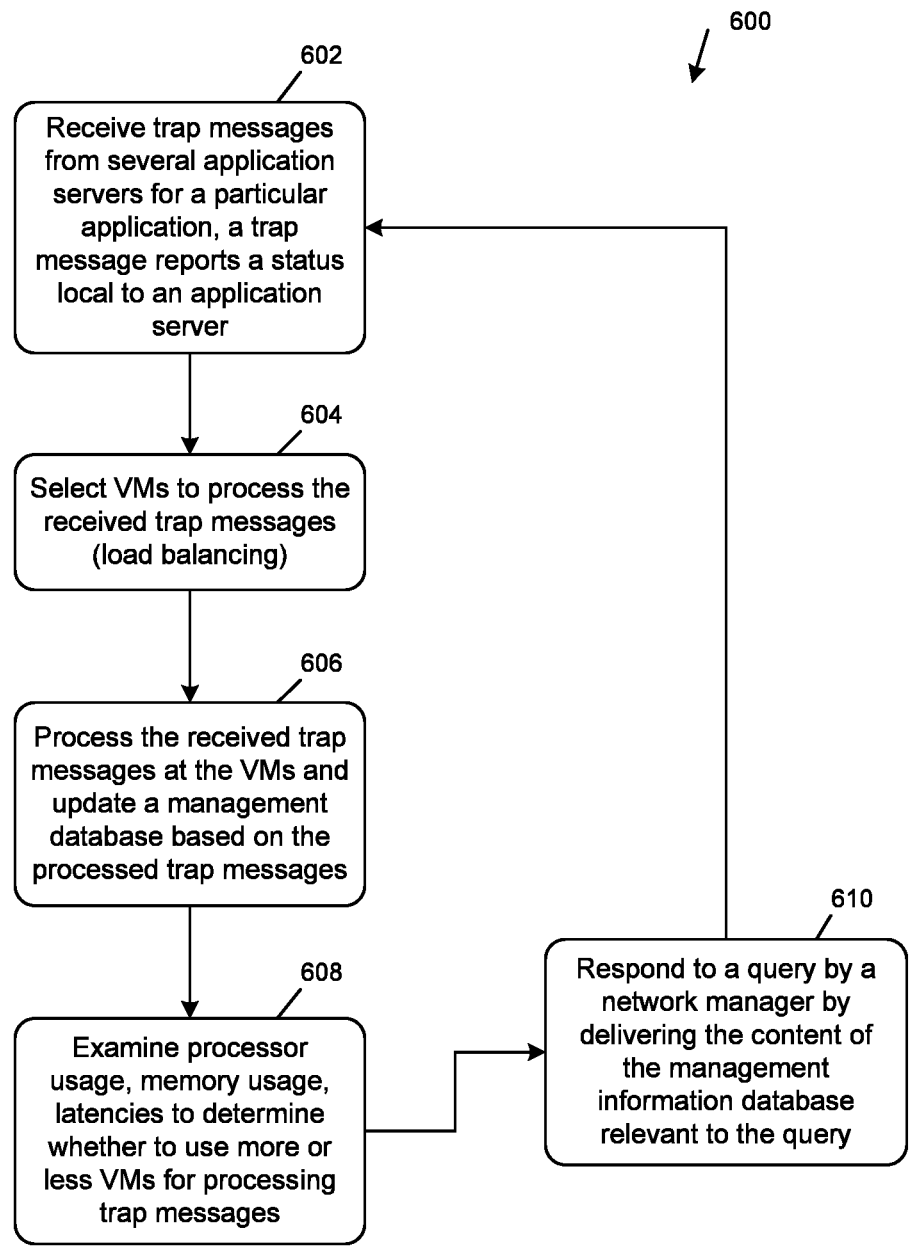
FIG. 6 conceptually illustrates a flow diagram of an example process performed by a trap receiver.

FIG. 6 conceptually illustrates a flow diagram of an example process 600 performed by a trap receiver. The trap receiver is operating several virtual machines and is in communication with several application servers as well as a network manager over a network. The process 600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

The process 600 starts at 602. At block 602, a trap receiver receives trap messages from several application servers for a particular application. A trap message from an application server reports status, event, or other information local to the application server that is of interest to a network manager. The process then proceeds to 604.

At block 604, the trap receiver selects virtual machines to process the received trap messages. Specifically, the trap receiver assigns each received trap message to be processed by a virtual machine in order to balance the workload among the virtual machines. The trap receiver performs load balancing by distributing trap messages in round-robin or another type of workload distribution algorithm. The process then proceeds to 606.

At block 606, the trap receiver processes the received trap message at the virtual machines. The trap receiver may update a management information database based on the processed trap messages. The process then proceeds to 608.

At block 608, the trap receiver examines workload parameters such as the processor usage, memory usage, and query latencies to determine whether to use more or less virtual machines for processing trap messages. The trap receiver may increase the number of virtual machines processing the trap messages if the workload of the virtual machines is more than a certain threshold. The trap receiver may also reduce the number of virtual machines processing the trap messages if the workload of the virtual machines is less than a certain threshold. The process then proceeds to 610.

At block 610, the trap receiver may respond to a query by the network manager by delivering the content of the management information database relevant to the query. The query and response may be conducted over SNMP protocol. The process returns to 602 to continue receiving trap messages from application servers and to process the received trap messages using the number of virtual machines that were determined at block 608.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors; and
   a computer-readable medium storing a plurality of computer-executable instructions that are executable by the one or more processors to perform a plurality of actions, the plurality of actions comprising:
   receiving trap messages regarding a particular application running on one or more application servers, wherein the one or more application servers are configured to send trap messages to the system without using a certified agent program;
   processing the received trap messages at a virtualized trap receiver that comprises one or more virtual machines hosted by a computing device, the received trap messages being assigned to a particular virtual machine of the one or more virtual machines by a load balancer of the trap receiver, the computing device being separate from the one or more application servers; and
   responding to a query by a network manager regarding an operation of the particular application running on the application servers based on the processed trap messages, wherein the virtualized trap receiver is operating the certified agent program,
   wherein only the certified agent program of the virtualized trap receiver is granted a client certificate by the network manager, and wherein the client certificate includes information for enabling communication between the certified agent program and the network manager via a Simple Network Management Protocol.

2. The system of claim 1, the plurality of actions further comprising determining whether to add a virtual machine to the one or more virtual machines to operate the virtualized trap receiver based on a workload of the one or more virtual machines.

3. The system of claim 2, wherein determining whether to add a virtual machine comprises examining processor usage, memory usage, or a latency between an application server and the network manager.

4. The system of claim 1, the plurality of actions further comprising operating a supervising virtual machine that determines whether to add a virtual machine to the one or more virtual machines based on a workload of the one or more virtual machines.

5. The system of claim 1, the plurality of actions further comprising updating a management information database based on the processed trap messages, wherein responding to the query comprises delivering content of the management information database relevant to the query.

6. The system of claim 1, wherein processing the received trap messages at the one or more virtual machines comprises selecting a virtual machine from the one or more virtual machines to process a received trap message.

7. A computer-implemented method, comprising:
   receiving trap messages regarding a particular application running on one or more application servers, wherein the one or more application servers are configured to send trap messages to the system without using a certified agent program;
   processing the received trap messages at a virtualized trap receiver that comprises one or more virtual machines hosted by a computing device, the received trap messages being assigned to a particular virtual machine of the one or more virtual machines by a load balancer of the trap receiver, the computing device being separate from the one or more application servers; and
   responding to a query by a network manager regarding an operation of the particular application running on the application servers based on the processed trap messages, wherein the virtualized trap receiver is operating the certified agent program,
   wherein only the certified agent program of the virtualized trap receiver is granted a client certificate by the network manager, and wherein the client certificate includes information for enabling communication between the certified agent program and the network manager via a Simple Network Management Protocol.

8. The computer-implemented method of claim 7, further comprising determining whether to add a virtual machine to the one or more virtual machines to operate the virtualized trap receiver based on a workload of the one or more virtual machines.

9. The computer-implemented method of claim 8, wherein determining whether to add a virtual machine comprises examining processor usage, memory usage, or a latency between an application server and the network manager.

10. The computer-implemented method of claim 7, further comprising operating a supervising virtual machine that determines whether to add a virtual machine to the one or more virtual machines based on a workload of the one or more virtual machines.

11. The computer-implemented method of claim 7, further comprising updating a management information database based on the processed trap messages, wherein responding to the query comprises delivering content of the management information database relevant to the query.

12. The computer-implemented method of claim 7, wherein processing the received trap messages at the one or more virtual machines comprises selecting a virtual machine from the one or more virtual machines to process a received trap message.

13. One or more non-transitory computer-readable media of a computing device storing computer-executable instructions that upon execution cause one or more processors to perform acts comprising:

receiving trap messages regarding a particular application running on one or more application servers, wherein the one or more application servers are configured to send trap messages to the system without using an agent program;

processing the received trap messages at a virtualized trap receiver that comprises one or more virtual machines hosted by a computing device, the received trap messages being assigned to a particular virtual machine of the one or more virtual machines by a load balancer of the trap receiver, the computing device being separate from the one or more application servers;

responding to a query by a network manager regarding an operation of the particular application running on the application servers based on the processed trap messages, wherein the virtualized trap receiver is operating the agent program; and wherein only the agent program of the virtualized trap receiver is granted a client certificate by the network manager, and wherein the client certificate includes information for enabling communication between the agent program and the network manager via a Simple Network Management Protocol.

14. The one or more non-transitory computer-readable media of claim 13, wherein the acts further comprise operating a supervising virtual machine that determines whether to add a virtual machine to the one or more virtual machines based on a workload of the one or more virtual machines.

15. The one or more non-transitory computer-readable media of claim 13, wherein processing the received trap messages at the one or more virtual machines comprises selecting a virtual machine from the one or more virtual machines to process a received trap message.

* * * * *